United States Patent [19]

Rice et al.

[11] Patent Number: 4,783,201

[45] Date of Patent: Nov. 8, 1988

[54] GAS DEHYDRATION MEMBRANE APPARATUS

[76] Inventors: Arthur W. Rice, 1733 Duello Rd., O'Fallon, Mo. 63366; Milton K. Murphy, 666 Langton Dr., Clayton, Mo. 63105

[21] Appl. No.: 137,901

[22] Filed: Dec. 28, 1987

[51] Int. Cl.$^4$ ............................................. B01D 53/22
[52] U.S. Cl. ......................................... 55/16; 55/68; 55/158
[58] Field of Search ........................... 55/16, 68, 158

[56] References Cited

U.S. PATENT DOCUMENTS

| | | | |
|---|---|---|---|
| 1,496,757 | 6/1924 | Lewis et al. | 55/16 |
| 3,709,774 | 1/1973 | Kimura | 55/16 X |
| 3,735,558 | 5/1973 | Skarstrom et al. | 55/16 |
| 3,735,559 | 5/1973 | Salemme | 55/16 |
| 3,852,388 | 12/1974 | Kimura | 55/16 X |
| 4,230,463 | 10/1980 | Henis et al. | 55/16 |
| 4,472,175 | 9/1984 | Malon et al. | 55/158 X |
| 4,486,202 | 12/1984 | Malon et al. | 55/158 |
| 4,497,640 | 2/1985 | Fournii et al. | 55/16 |
| 4,568,579 | 2/1986 | Watson | 55/16 X |
| 4,654,055 | 3/1987 | Malon et al. | 55/16 X |
| 4,718,921 | 1/1988 | Makino et al. | 55/16 |
| 4,728,346 | 3/1988 | Murphy | 55/16 X |

FOREIGN PATENT DOCUMENTS

| | | | |
|---|---|---|---|
| 159783 | 10/1985 | European Pat. Off. | 55/16 |
| 145343 | 12/1978 | Japan | 55/16 |
| 6345 | 1/1979 | Japan | 55/16 |
| 13653 | 2/1979 | Japan | 55/158 |
| 152679 | 12/1979 | Japan | 55/16 |
| 238120 | 11/1985 | Japan | 55/158 |
| 25621 | 2/1986 | Japan | 55/158 |
| 42723 | 2/1987 | Japan | 55/16 |
| 191017 | 8/1987 | Japan | 55/16 |
| 2134814 | 8/1984 | United Kingdom | 55/16 |

*Primary Examiner*—Robert Spitzer
*Attorney, Agent, or Firm*—Henry Croskell

[57] ABSTRACT

This invention provides an apparatus and process for dehydrating gases, the apparatus comprised of uncoated, asymmetric membranes having controlled porosity. The membranes being formed of polymeric materials which have high transport selectivity for water vapor and sufficient porosity to provide adequate feed gas permeation sweep for the permeated water vapor ensuring conditions of continued effective dehydration. Uncoated asymmetric gas separation membranes have been found to be effective for dehydrating gases such as air, gases containing hydrocarbons, acid gases and admixtures of these gases. The membranes provided by the invention possess a unique combination of properties and characteristics which promote an effective process for the dehydration of gases.

27 Claims, No Drawings

GAS DEHYDRATION MEMBRANE APPARATUS

BACKGROUND OF THE INVENTION

This invention relates to apparatus for dehydrating gases wherein the apparatus is comprised of membranes having dehydrating capability. In another aspect, the invention relates to a process for post-treatment of uncoated asymmetric gas separation membranes for the purpose of controlling porosity and feed gas flux rates. In yet another aspect, the invention relates to process for dehydrating gases using membranes having high water flux and controlled porosity which promotes use of part of the feed gas stream for sweep purposes, i.e., the removal of water vapor permeate partial pressure build-up.

Water, being an active molecule, necessitates the removal of same for storage of various materials including drugs and other chemicals. From a hygienic view point, dehydration is necessary because the multiplication of micro-organisms such as mold is more active at high humidity and the degree of sultriness which the human body experiences is influenced not only by high temperature but also by high humidity. Further, humidity control is practiced in a wide variety of fields including electrical industry, precision machine industry, textiles industry, chemical process and petroleum industries.

Presently, there are various methods for removing water vapor. One method involves bringing gas into contact with a hygroscopic agent, such as a silica gel, a molecular sieve, quick lime, calcium chloride, phosphorous pentoxide, lithium chloride, or concentrated sulfuric acid, to remove moisture contained in the feed gas. In this method, it is necessary to dispose or regenerate the used hygroscopic agent and, therefore, continuous operation is impossible when only one dehumidifier for dehydration is used.

A second method involves condensing moisture contained in a gas by compressing or cooling the gas to thereby remove the moisture. This method has an advantage in that continuous operation and mass treatment are possible, but has disadvantages in that it requires a large quantity of energy and dehydration to low humidity is difficult.

In a more recently developed method, water vapor is removed from a gas by using membranes having selective permeability to water vapor. This method includes two processes, i.e., one in which a homogenous membrane is used and one in which a porous membrane carries a hygroscopic agent. Both of these processes have an advantage in that continuous operation are possible.

The process in which a homogenous membrane is used provides a high separation ratio but has a disadvantage in that the permeation rate is low. When the permeation rate is low, the quantity of water permeated can be increased by increasing the difference in partial pressure between both surfaces of the membrane, which serves as a driving force for permeation through the membrane. However, this has been difficult because the saturated water vapor pressure is as low as about 20mm Hg at room temperature, while the water vapor pressure on the permeate side of the membrane is high; thus creating an undesired partial pressure differential which prohibits additional permeation of water vapor.

The process in which a porous membrane carries an absorbent is one involving the use of the membrane formed by impregnating a porous support, for example, paper, cloth, or nonwoven fabric with a hydroscopic polymer, for example, polyvinyl alcohol or polyethylene glycol and/or a hygroscopic agent such as for example lithium chloride. This process could provide a high permeation rate but has a disadvantage in that the membrane contains a hygroscopic polymer agent which absorbs water when the membrane is used or left standing under a high humidity condition so that the formed solution exudes from the membrane to lower the performance of the membrane. In the membrane separation method, it is most suitable to increase the difference in water vapor partial pressure between surfaces of the membranes by reducing the pressure on the permeate side, but this is thought to be impossible because a membrane does not have sufficient pressure resistance. In fact, in the above mentioned process, the reduction in pressure is not realized and the moisture is simply exchanged between a gas mixture and dry gas. A dehydration process which is carried out by using dry gas cannot provide good efficiency because dehydration of a gas mixture of 100% relative humidity to below 10% relative humidity requires dry gas of 0% humidity in an amount of about 10 times that of gas to be dehydrated assuming the moisture exchanges perfectly.

The presence of water in gas containing hydrocarbons is also troublesome because of risk of solid hydrate formation and the risk of corrosion if these gases also contain carbon dioxide and/or hydrogen sulfide. Gases containing hydrocarbons such as natural gases, blanket gases located in layers lying above oil layers in an oil field, associated gases obtained by the separation of a gas/oil mixture, and gases originating from a variety of sources such as petroleum refineries present difficulties in handling and storage when water vapor is present. It is necessary to produce gases having water content of very small values if these gases are to be transported or conditioned for certain subsequent treatment such as liquification, transportation, or marketing.

In certain particular cases, it is possible to overcome the disadvantage of the presence of water in a gas by reducing the pressure of the gas and/or by heating the gas, but these processes are only applicable in the case of particular use; for example, they are economically unacceptable where gases have to be transported over a long distance, and they are obviously unsuitable for marketing the gases and for complying with the specifications imposed on marketing.

Known processes of dehydration at the oil or gas well head include, in particular, dehydration by cooling, dehydration by contact with glycol, dehydration by absorption onto silica gels, and dehydration over molecular sieves. All these processes require installations which are generally large and expensive, especially if the gas is to be transported. Furthermore, the glycol dehydration units present problems of safety, of weight and bulk. Silica gel and molecular sieve systems can only be considered in various particular cases, because of high cost.

Dehydration utilizing passive systems of permeation through a permeation membrane with a non-porous separating layer which is capable of being automated, offers an alternative satisfying safety requirements; however, such a passive membrane system has not been found to be suitable because of the build up of the water vapor permeate partial pressure on the permeate side of the membrane which does not allow continuous water vapor permeation at desired and practically useful levels.

In general, the passage of a gas through a membrane may proceed through pores, i.e., continuous channels for fluid flow in communication with both feed and exit surfaces of the membrane (which pores may or may not be suitable for separation by Knudsen flow or diffusion). In another mechanism, in accordance with current views of membrane theory, the passage of a gas through the membrane may be by interaction of the gas with the material of the membrane. In this latter postulated mechanism, the permeability of a gas through a membrane is believed to involve the solubility of the gas in the membrane material and diffusion of the gas through the membrane. The permeability constant for a single gas is presently viewed as being the product of the solubility and diffusivity of the gas in the membrane. A given membrane material has a particular permeability constant for passage of the given gas by the interaction of the gas with material of the membrane. The rate of permeability of the gas, i.e., flux through the membrane, is related to the permeability constant, but is also influenced by variables such as the membrane thickness, density, free volume, the physical nature of the membrane, the partial pressure differential of the permeate gas across membrane, the temperature and the like.

Uncoated membranes found to be suitable for use in gas dehydration membrane apparatus according to the invention include asymmetric gas separation membranes (absence the coating material) as addressed by Henis and Tripodi in their U.S. Pat. No. 4,230,463, herein incorporated by reference. These and other uncoated asymmetric membranes having high water vapor flux when appropriate post-treatment provides controlled porosity are suitable according to the invention. Additional uncoated membranes having enhanced water vapor flux and found to be most suitable for gas dehydration are comprised of glassy, hydrophobic polymers wherein the membrane first heat $T_g$ which is greater than the first heat $T_g$ of the bulk sample of the glassy, hydrophobic polymers. The membranes have graded density skins and exhibit high permeabilities and specifically high water vapor flux.

The membranes having graded density skins result from, for example, spinning or casting dopes comprised of glassy, hydrophobic polymers in a solvent system of Lewis acid, a Lewis base and a Lewis acid:base complex, the solvent system capable of dissolving the polymer and being readily disassociated by polar coagulation medium which provides macrovoid-free, asymmetric membranes possessing high free volume and graded density skins. These membranes having graded density skins are provided by Kesting et al, as taught in U.S. patent application No. 66752 filed July 6, 1987, hereby incorporated by reference. Kesting and his co-workers developed as asymmetric gas separation membrane which in its uncoated state has been found to be suitable according to the invention in providing high water flux and sufficient controlled porosity to permit a controlled portion of the feed gas to permeate and sweep the water vapor from the permeate side of the membrane.

DEFINITIONS

For purpose of defining the invention, the following terms and phrases will have the meaning as set out below.

In accordance with the invention, the uncoated asymmetric gas separation membranes and those graded density skin membranes which exhibit maximum density at the surface which is further from the porous substructure, have sufficient controlled porosity to allow a percentage of the feed gas to permeate for sweep purposes. The separation membrane is essentially the same material, throughout its structure, i.e., the asymmetric separation membrane is substantially chemically homogenous. The material of the separation membrane exhibits selective permeation for water vapor and other fast permeating gases relative to remaining gas components of gas feed mixtures hence the separation membrane is defined as a "separation membrane". By describing the separation membrane as asymmetric, it is meant that the membrane has a thin, dense skin supported by a thick, porous substrate (matrix) in which both layers are formed from a single sol by phase inversion process. The phase inversion process is a general process of membrane manufacture that utilizes a sol which inverts into two interdispersed liquid phases, that is, polymer coated micelles of the dispersed phase and a continuous second liquid phase, prior to, or simultaneously with gellation at which time the emulsoid nature of what once was a sol is immobilized as a gel. The uncoated membranes utilized according to the invention advantageously provide the separation of at least one gas from a gaseous mixture by interaction with the materials of the separation membrane, enhanced by free volume, controlled porosity, and graded density skins.

A separation factor ($\alpha a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability $P_a/l$ of a membrane thickness l or a gas of a gaseous mixture to the permeability of the same membrane to gas b, $P_b/l$ wherein the permeability for a given gas is the volume of gas, standard temperature and pressure (STP), which passes through a membrane per square centimeter of surface area, per second, for a partial pressure drop of 1 centimeter of mercury (cmHg) across the mebrane per unit of thickness, and is expressed a $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors is disclosed by Hwang, et al., *Techniques of Chemistry*, Volume VII, *Membranes in Separations*, John Wiley & Sons, 1975 (herein incorporated by reference) at Chapter 12, pages 296 to 322.

Dense, as in dense film, refers to the absence of voids $> \sim 5$ angstroms ($5 \times 10^{-10}$ meters) in diameter within the typical structure. However, the thin skins of integrally-skinned membranes, although dense on the whole, invariably contain a few large defects which must be sealed if intrinsic $\alpha$ is to be obtained.

As asymmetric or an integrally-skinned membrane is a two or more layered membrane of the general class first prepared by Loeb-Sourirajan consisting of a thin dense skin supported by a thick porous substructure (matrix) in which the layers are formed from a single sol by a phase inversion process.

First heat $T_g$ is recorded at the first excursion of a differential scanning calorimetry (DSC) sample through the $T_g$ range and may differ from that obtained in subsequent heats. If the first heat $T_g$ is higher than that of the bulk polymer, and no crosslinking, etc., has occurred, it is evidence that the sample contained a free volume higher than that of the bulk polymer. If the first heat $T_g$ is lower, the presence of residual solvent may be indicated.

Free volume ($V_f$) is the volume in a polymer film which is available for gas permeation; $V_f = V_t -$ where $V_o$ where $V_t =$ total macroscopic volume and $V_o = $ volume occupied by vibrating macromolecules. The $V_f$ fraction in a typical glassy polymer is $\sim 0.025$ at its $T_g$.

Glass transition temperature ($T_g$) is the temperature at which the thermal expansion coefficient changes during the course of proceeding from the glassy to the rubbery state. The viscosity at the $T_g = 10^{13}$ poises (1 poise = 1 gram/cm/sec). Theoretically at a value of 51.6° C. below the $T_g$, the viscosity becomes infinite. The first heat $T_g$ increases with increasing $V_f$.

Macrovoids—the large (10-100 μm) diameter voids found within the normal sponge-like matrix which itself consists of small 0.1-2 μm (1 μm = $\times 10^{-6}$ meters) diameter open cells. Macrovoid-containing membranes such as those utilized for ultrafiltration by Tsugaya et al are unsuitable for gas separations. The asymmetric gas separation membranes having graded density skins according to the invention are macrovoid-free or essentially macrovoid-free membranes. Macrovoids originate from sols which are metastable at the sol gel transition as a result of being too fluid or too far removed from the point of incipient gelation (PIG) so that sol inhomogeneities can arise which are then frozen into the membrane structure after gelation as discussed by R. E. Kesting, *Synthetic Polymeric Membranes—A Structural Perspective*, 2nd Edition, Wiley-Interscience, 1985.

Skin is the thin ($\sim 2500$ A, where $1 A = 1$ Angstrom $= 1 \times 10^{-10}$ meters) dense layer observable with scanning electron microscope (SEM) which is found in integrally-skinned (asymmetric) membranes. A skin can of uniform density in which case the skin and active separating layer are identical, or it can be of graded density in which case the active layer thickness is less than the skin thickness.

Hydrophobic materials or polymers as used in this description refer to water absorption values of between 0.02% and 1.0% after immersion in water for 24 hours of the materials or polymers as determined by ASTM D-570 6.1 standards; however, it is possible that other hydrophobic materials and polymers with higher water absorption value could be formed into the membrane morphologies of this invention.

Acid gases as used herein are present in most natural gas streams and are comprised of carbon dioxide and hydrogen sulfide. Many gas streams, particularly those used in a refinery or for manufacturing gases, may contain mercaptans, carbon disulfide and carbonyl sulfide; however, these are usually present only as by-products of some man-made process which involves natural gases containing originally carbon dioxide and hydrogen sulfide.

SUMMARY OF INVENTION

This invention concerns a separation membrane having a controlled pore size, a method of controlling differentially the pores in the skin layer of the membrane and the use of the membrane in a gas dehydration membrane apparatus. In particular, the invention concerns an uncoated gas separation membrane having controlled pore size; a process for controlling the pore size through post-treatment of the formed membranes through chemical and/or thermal means; and to a method of employing the membranes in the dehydration of gases.

The present invention relates to a process for preparing a unique asymmetric, uncoated membrane of controlled and selected pore size in the skin layer, which membrane is suitable for use as a dehydration membrane, and particularly suitable for use in the dehydration of air, gases containing hydrocarbons, acid gases and admixtures of these gases. The process for producing the suitable dehydration membrane having controlled pores size comprises chemical treatment techniques and/or post thermal treatment of the uncoated membranes to produce a dehydration membrane while yet providing adequate feed gas permeation for sweep purposes. The process for post-treatment of the membranes can be achieved by heat annealing and/or post-treatment solution through a technique of general chemical annealing. The post-treatment solution typically comprises a volatile solvent or nonsolvent of the articular polymer of the membrane as well as swelling agents and the like.

Suitable membranes in an uncoated fiber configuration having high water vapor flux and sufficient feed gas permeation due to the controlled porosity are used in the gas dehydration membrane apparatus of the invention. These hollow fiber membranes can be treated, for example, using a weak solvent for the polymer which alters the porosity and slow gas flux rate without appreciably increasing separation capability for some slow gas components, such as $O_2$ and $N_2$ in air. Thus one or more fast gas components such as water can be selectively moved from a stream without appreciably altering the composition ratio of the remaining gas components of the stream. For example, the separation of water vapor from compressed air is achieved through use of an uncoated membrane which has been treated with one or combination of the following: compressor oil vapor, low molecular weight silicone oils, acetone, isopentane, methanol and the like. The percent of feed air lost as permeate gas can range from 15-50% while water vapor concentrations can be reduced by a factor of 10-30x, for example, dewpoint reduction at 100 psig ($1.45 \times 10^{-4}$ Pa) from about 100° F. to 30° F. The resultant dry air product can contain 19-20% oxygen with a balance being dominately nitrogen, i.e., a separation factor of the uncoated post-treated membrane for oxygen/nitrogen in the range of about 1.05 to about 2.0.

The amount of air lost to the permeate side is related in a complex manner to the precise nature of the porosity of the membrane skin which can be controlled by the severity of the post-treatment of the uncoated membranes. The amount of permeate air required to sweep the water vapor from the system at for example 100 psig ($1.45 \times 10^4$ Pa) is approximately 15% of the feed. Treatment conditions, i.e., drying temperature and humidity and solvent concentration or type of solvent, are used to control the amount of air lost for given degree of moisture removal. In practice, the effective water vapor flux is controlled substantially by the permeate side partial pressure, which in turn is controlled by the permeation flux rate of a portion of the feed stream.

DETAILED DESCRIPTION

In accordance with the present invention, uncoated, controlled porosity, asymmetric separation membranes can effectively be used to dehydrate gases. In order for such membranes to be of practical and economic utility, the transport properties of the membranes must be in certain ranges and have specific relationships, with respect to, for example, transport of fast permeating water vapor relative to slow permeating components of the feed gas which is to be dehydrated. For example, in order to provide for adequate rate of water vapor removal and yet permit the dehydration membrane device to be of a practically useful and economical size, $P/l$ $H_2O$ must be a high value, preferably in the range of about $300-1500 \times 10^{-6}$ $cm^3/cm^2$-sec-cmHg. In order to maintain a continuous dehydration performance in the use of the dehydration membrane system, a controlled permeation rate of slow gas components must be provided to permit the permeate to adequately sweep water vapor from the downstream side of the membrane and yet the permeability of slow gas components must not be so high as to result in excessive, uneconomical loss of feed. Thus, $P/l$ of slow gas (e.g., air, $CH_4$, $CO_2$ and the like) is preferably in the range of about $10-100 \times 10^{-6}$. These relationships serve to define a range of practically useful ratios of permeabilities of fast gas (i.e., water vapor) relative to slow gas (i.e., air, $CH_4$, $CO_2$ etc.) which may be conveniently expressed as $\alpha_{slow\ gas}{}^{H2O} = (P/l\ H_2O)/(P/l\ slow\ gas)$. The preferred relationships being in the range $\alpha_{slow\ gas}{}^{H2O}$ of about 10 to about 50. We have found useful to employ tests of oxygen/nitrogen separation capability to gauge whether or not the membrane porosity may lie in an appropriate range to indicate proper controlled porosity. In accordance with this invention, the separation selectivity $\alpha O_N{}^{2O2}$ is preferably in the range of about 1.05 to about 2. The above preferred ranges and relationships of transport properties of the uncoated, controlled porosity, asymmetric dehydration membranes yield a unique combination of properties and characteristics which make these membranes and processes utilizing them unexpectedly effective for dehydration of gases. This combination of properties clearly distinguishes the membranes of the present invention from known dense nonporous membranes or coated membranes which afford both impractically low $P/ls$ for $H_2O$ and slow gas, making such systems too large and too costly to be attractive. In addition, such membranes fail to provide effective permeation sweep rates. Further, known porous membrane systems, such as ultrafiltration membranes, do not offer appropriate controlled porosity. Such systems would have high $P/l$ $H_2O$ properties, but would have excessive $P/l$ slow gas properties, such that loss of feed gas would be uneconomically excessive.

EXPERIMENTAL DETAILS

Fiber Spinning

The hollow fibers recorded in the following tables were spun by a standard wet spinning process. Deaerated sol (dope) was delivered at a rate of up to 20 m/min to a tube-in-orifice type spinnerette. The spinnerette at a temperature between 15°-100° C. by the application of sufficient heat to maintain adequate sol flow. Water was injected into the fiber lumen at a rate of up to 10 m/min to form the nascent hollow fiber which was drawn at a rate of up to 100 m/min. The fiber is drawn through water baths maintained at temperatures of up to ambient and above, but less than about 50° C. The hollow fiber is then washed for up to 7 days in running water. Hanks of hollow fibers are then formed by skeining the fiber from the bobbin. These hanks are then hung vertically and dried rapidly at about 100° C., unless otherwise noted. Specific fiber spinning details are noted in the following examples.

Hollow Fiber Permeability Testing

Permeability and selectivity values were obtained from 1 to 3 inch (2.54 to 7.62 cm) diameter by 1 to 3 foot (0.31 to 0.91 m) long hollow fiber bundles with epoxy tube sheets at one or both ends. All fibers were 400 to 600 μm OD (outside diameter) and 150 to 250 μm ID (inside diameter). The separators were treated in various manners as explained in examples, and placed into a holder or pressure vessel for testing. Gas flow rates and compositions of the permeate and nonpermeate streams were measured. Permeability of each gas component was computed using an iterative computer calculation which increments along the separator axis using the partial pressure of each component.

For the purpose of defining preferred permeability relationships in the context of the present invention, the following mathematical expressions are employed. Water vapor permeability= $P/lH_2O$ is calculated as defined in the above equation for $P/l$. Similarly, $P/l$ is defined for other gases in mixtures where it is desirable to remove the water vapor. For example, in the case of the dehydrating air, it is useful to define $P/l$ air as follows: $P/l\ air = [0.2 \times P/l\ O_2) + (0.8 \times P/l\ N_2)]$, where $P/l\ O_2$ and $P/l\ N_2$ are calculated from test measurement data. In the context of the present invention, it is also useful to define separation factor, $\alpha_y{}^x$, as the ratio of $P/l$, values for components x and y, such that $\alpha_y{}^x = P/lx/P/ly$.

Composition analysis were conducted using a Servomed 540 A oxygen analyzer for oxygen, a General Eastern 1200 APS hydrometer and/or a Panametrics aluminum oxide dewpoint sensor for water, and all remaining air components were considered to be nitrogen.

Dewpoints, unless otherwise specified were measured at and are reported at noted pressure.

Packing factors for fiber bundles in shells were kept at 50±5% as computed by wet fiber dimensions, unless otherwise specified.

Fiber dimensions are reported as wet spun dimensions.

All examples shown are for tests which observed dewpoints for 1 to 4 hours unless otherwise specified.

All testing was conducted with the permeate side of the membrane vented to atmospheric pressure, thus the permeate side pressure was about 14.7 psia ($2.13 \times 10^3$ Pa) unless otherwise specified.

EXAMPLE 1

Hollow fiber membranes used in this example were spun from a solution of polysulfone polymer (P-3500, Amoco Performance Polymers Co.) dissolved in a mixture of 1-formylpiperidine solvent (87 weight percent) and formamide nonsolvent (13 weight percent). Polymer concentration in the spinning solution was 37% by weight.

Uncoated polysulfone fiber of 250 μm ID, 500 μm OD was formed into a 1″×2′ (2.54 cm×0.61 m) bundle of 5316 $cm^2$ area and potted at one end, with the other end sealed via hot wire melt cut. It was tested using shell side feed with water saturated, filtered air at 31° C. and 100 psig ($1.45 \times 10^4$ Pa). The nonpermeate product stream flow was controlled at 0.243 SCFM ($6.88 \times 10^{-3}$ m³/min) and found to contain 20.1% $O_2$ with a dewpoint of $-9.5°$ C. The permeate flow was found to be 0.236 SCFM ($6.68 \times 10^{-3}$ m³/min) containing 21.2% $O_2$. The resultant computed P/l ($\times 10^{-6}$) and alphas were found to be as follows:

| P/l$O_2$ | P/l$N_2$ | P/l$H_2O$ | P/l air | $\alpha_{N_2}^{O_2}$ | $\alpha_{air}^{H_2O}$ |
|---|---|---|---|---|---|
| 40.1 | 38.6 | 255. | 38.9 | 1.04 | 6.6 |

EXAMPLE 2

Hollow fiber membranes used in this example were spun as indicated in Example 1.

Uncoated polysulfone fiber of 250 μm ID, 500 μm OD was formed into a bundle of 1" (2.54 cm) diameter. Both ends of the bundle were cut and sealed then with a hot wire to 1 foot (0.31 m) length. The bundle was then subjected to 10 minute immersion in isopentane at room temperature and dried in an air circulating oven at 42° C. overnight (about 12 hours). This fiber bundle was then potted at both ends to form a bore side feed separator of 6500 cm² surface area. It was placed in a vessel to allow bore side feed and collection of the permeate and nonpermeate streams. This separator was then tested with filtered air feed at 135 psig ($1.96 \times 10^4$ Pa), 22° C., and feed dewpoint of 20.3° C. The nonpermeate stream flow was controlled at 0.956 SCFM ($2.7 \times 10^{-2}$ m³/min) and found to contain 20.0% $O_2$ and have a dewpoint of 4.6° C. The permeate flow was found to be 0.93 SCFM ($2.63 \times 10^{-2}$ m²/min) and contained 25.6% $O_2$. The resultant computed P/ls ($\times 10^{-6}$) and αs were found to be as follows:

| P/l$O_2$ | P/l$N_2$ | P/l$H_2O$ | P/l air | $\alpha_{N_2}^{O_2}$ | $\alpha_{air}^{H_2O}$ |
|---|---|---|---|---|---|
| 11.7 | 8.5 | 364. | 9.1 | 1.38 | 39.8 |

EXAMPLE 3

Hollow fiber membranes used in this example were spun as indicated in Example 1.

Another bore side feed separator of similar fiber as in Example 2 except that the fiber treatment was with methanol instead of isopentane. It was tested in the same device and at same conditions as Example 2. The computed P/Ls ($\times 10^{-6}$) and αs were found to be as follows:

| P/l$O_2$ | P/l$N_2$ | P/l$H_2O$ | P/l air | $\alpha_{N_2}^{O_2}$ | $\alpha_{air}^{H_2O}$ |
|---|---|---|---|---|---|
| 9.4 | 6.3 | 224. | 6.9 | 1.49 | 32.4 |

This example demonstrates for comparative purposes post-treatment that is excessively severe and results in slow values for P/l $H_2O$ and P/l air.

EXAMPLE 4

Hollow fiber membranes used in this example were spun from the same polysulfone polymer as used in Example 1, except that the spinning solution was composed of 37 weight percent polysulfone in a mixture of N-methylpyrrolidone solvent (57 weight percent) and propionic acid nonsolvent (43 weight percent).

Uncoated polysulfone fiber of 250 μm ID, 500 μm OD was formed into two bundles (indicated as 4A and 4B) of 1"×1' (2.54 cm×0.31 m) and subjected to treatment with methanol. Treatment consisted of immersing the hot wire cut bundles into room temperature (about 20°±2° C.) methanol for 10 minutes, then overnight drying at 42° C. in an air circulating oven. These bundles were potted at both ends to form bore side feed separators of approximately 6500 cm² surface area. These separators were tested with air feed at the following conditions:

| | Feed | | | |
|---|---|---|---|---|
| Separator | Temp °C. | Dew Point °C. | Pressure PSIG | Nonpermeate Flow SCFM |
| 4A | 26 | 25.5 | 135 | 1.02 |
| 4B | 28 | 27.8 | 135 | 1.56 |

| | Nonpermeate | | Permeate | |
|---|---|---|---|---|
| Separator | Dew Point | $O_2$ % | Flow SCFM | $O_2$ % |
| 4A | −13.5 | 19.9 | 0.31 | 23.5 |
| 4B | +3.0 | 20.2 | 0.30 | 23.2 |

NOTE:
1 SCFM = $2.832 \times 10^{-2}$ (std) m³/min; 1 PSIG = $1.45 \times 10^2$ Pa.

P/ls ($\times 10^{-6}$) and α were computed to be as follows:

| Separator | P/l $O_2$ | P/l $N_2$ | P/l $H_2O$ | P/l air | $\alpha_{N_2}^{O_2}$ | $\alpha_{air}^{H_2O}$ |
|---|---|---|---|---|---|---|
| 4A | 35.6 | 28.8 | 772. | 30.2 | 1.24 | 25.6 |
| 4B | 33.6 | 28.1 | 770. | 29.2 | 1.20 | 26.4 |

EXAMPLE 5

Hollow fiber membranes used in this example were spun as indicated in Example 4.

Uncoated polysulfone fiber 250 μm ID 500 μm OD was formed into two 1"×1' (2.54 cm×0.31 m) single ended separators. One (separator 5 A) was treated with isopentane as in Example 2 and subjected to unfiltered compressed air feed from an oil lubricated rotary compressor. The other (separator 5 B) was treated with an 0.05 weight % solution of 250 MW silicone oil in isopentane. The treatment procedure used a vessel which subjected the shell side to the isopentane solution at ambient temperature and pressure while applying a 26" (66 cm) Hg vacuum to the bore side for 5 minutes after which the isopentane was allowed to evaporate. This treated separator (5 B) was then tested in the same air feed stream except that a Zeks Color Guard TM oil coalescer filter was placed in the feed upstream of the separator.

Separator 5 A was run for 76 hours and separator 5 B was run for 20 hours. Feed pressure was maintained at 130 psig ($1.89 \times 10^4$ Pa) and separator temperature at 40° C. in a thermostated water bath. Feed dewpoints ranged from 25° to 37° C. The following Table 1 gives an example of the performance of these two separators over the duration of the tests. This is an example of experience with oil vapor treatment. Continuously applied oil vapor tends to slow the oxygen and nitrogen permeability down in a fashion seen for polymer creep, a straight line on a semilog graph with time. When the oil vapor is removed from the feed by filtration, the permeate flow then begins to increase as some of the oil is carried out of the separator. This regaining of permeate flow is only fractional, and is no more than ¼ of the flow lost initially to oil vapor exposure.

EXAMPLE 6

This example is included to clarify that appropriate packing factors and vessel design considerations are important to optimum performance of the device. The incremental permeate gas at the dry gas product exit end of the device has a much lower water content than the incremental permeate at the feed inlet end. This is also true of the nonpermeate gas; $H_2O$ vapor levels in the feed are often a factor of 10 (or more) times that desired in the dry product. Therefore, it is advantageous to use the incremental drier permeate from the product end as a sweep gas.

In effect, the most desirable result is to obtain true countercurrent flow of the permeate vs. nonpermeate streams, thus maximizing the sweep gas effect. The sweep gas effect is to lower the average partial pressure of the water on the permeate side, thus increasing the overall partial pressure driving force for water permeation. For bore side or shell side feed separators, it is the shell side design (flow characteristics) which determines the efficiency of the separator. The following example compares good vs. poor shell side flow characteristics for a bore side feed case.

Hollow fiber membranes used in this example were spun as indicated in Example 4.

A 2 inch (5.1 cm) diameter by 3 foot (0.91 m) long bore side feed separator was constructed of 250 μm ID, 500 μm OD polysulfone fiber which had been treated with methanol as in Example 4. This separator had effective surface area of 58727 cm². The separator bundle was placed into a 2½ inch (6.4 cm) diameter vessel configured for bore side feed. The bundle was stretched and restricted with an elastic web sleeve such that a uniform ¼" (0.64 cm) space existed between the outside of the bundle and the inside of the vessel, thus leaving a space for channeling of the permeate gas down the outside of the bundle.

This separator was tested in unfiltered compressed air at 28° C. and 105 psig ($1.52 \times 10^4$ Pa) as shown in Table 2, then disassembled and reconfigured by adding a nonporous polyethylene sleeve between the elastic web sleeve and the bundle. The polyethylene sleeve was fixed to the epoxy tube sheet at the dry gas product end to prevent any permeate gas from flowing out that end, and left open at the feed end.

TABLE 1*

| Hours into Test | Feed Dewpoint °C. | Nonpermeate Flow SCFM | Nonpermeate Dewpoint °C. | $O_2$ % | Permeate Flow SCFM | $O_2$ % | P/l (× $10^{-6}$) $O_2$ | $N_2$ | $H_2O$ | Air | $\alpha_{N_2}^{O_2}$ | $\alpha_{air}^{H_2O}$ |
|---|---|---|---|---|---|---|---|---|---|---|---|---|
| \multicolumn{13}{c}{Separator 5A, Isopentane treat, oil vapor feed, 4748 cm² surface area} |
| 0.5 | 33.3 | 1.30 | 4.0 | 20.2 | 0.587 | 21.5 | 84.0 | 80.0 | 706. | 80.8 | 1.05 | 8.7 |
| 18.0 | 26.0 | 1.13 | 2.5 | 20.1 | 0.325 | 22.9 | 49.5 | 43.4 | 600. | 44.6 | 1.14 | 13.4 |
| 47.5 | 35.0 | 0.92 | 6.4 | 19.8 | 0.212 | 24.0 | 33.7 | 27.9 | 599. | 29.1 | 1.21 | 20.6 |
| 64.5 | 26.2 | 0.81 | −1.2 | 19.6 | 0.182 | 25.1 | 30.3 | 23.7 | 600. | 25.0 | 1.28 | 24.0 |
| \multicolumn{13}{c}{Separator 5B, 250 MW silicone oil treat, clean feed, 4490 cm² surface area} |
| 0.5 | 38.0 | 1.07 | 18.1 | 19.6 | 0.139 | 28.9 | 23.7 | 15.8 | 616. | 17.4 | 1.50 | 35.4 |
| 20.0 | 25.0 | 0.78 | 0.1 | 19.0 | 0.128 | 30.8 | 27.4 | 16.6 | 729. | 18.8 | 1.65 | 38.9 |

TABLE 2*

| Test | Feed Temp °C. | Feed Pres. PSIG | Feed Dewpoint °C. | Nonpermeate Flow SCFM | $O_2$ % | Nonpermeate Dewpoint °C. | Permeate Flow SCFM | $O_2$ % | P/l (× $10^{-6}$) $O_2$ | $N_2$ | $H_2O$ | Air | $\alpha_{N_2}^{O_2}$ | $\alpha_{air}^{H_2O}$ |
|---|---|---|---|---|---|---|---|---|---|---|---|---|---|---|
| with channel | 28 | 105 | 27 | 9.39 | 20.1 | 0.6 | 4.03 | 22.0 | 60.2 | 54.9 | 553. | 56.0 | 1.10 | 9.9 |
| with sleeve | 28 | 105 | 27 | 10.06 | 20.3 | −4.3 | 3.80 | 22.0 | 57.1 | 52.1 | 764. | 53.1 | 1.10 | 14.4 |

*1 SCFM = $2.832 \times 10^{-2}$ (std) m³/min; 1 PSIG = $1.45 \times 10^2$ Pa

The sleeve thus forced all permeate gast to flow countercurrent to the feed, and stay inside the bundle to provide an efficient sweep gas with little or no channeling. The separator was reassembled and retested as shown in Table 2. The apparent water permeability was seen to increase by 38% and is attributed to the improved countercurrent sweep gas effect caused by the sleeve.

EXAMPLE 7

This example is to show that the device will dry gases other than air, for example methane gas.

Hollow fiber membranes used in this example were spun as indicated in Example 4.

Polysulfone hollow fiber 250 μm ID, 500 μm OD was treated with methanol at room temperature for 25 minutes and allowed to dry overnight (about 12 hours) in air in a ventilated room at 26° C. It was then formed into a 1"×1' (2.54 cm×0.31 m) bore side feed separator of approximately 6500 cm² surface area. It was first tested using clean air fed which had been passed through a water saturator, and subsequently tested using commercial bottled methane which was also passed through the feed gas saturator. The test conditions and results are shown in Table 3.

Test conditions differ slightly as shown in the table. Note that comparable values result in tests for water permeability and that similar values are measured for permeabilities of air components and for methane, i.e., slow gases.

TABLE 3*

| Test | Feed Temp °C. | Feed Press PSIG | Feed Dewpoint °C. | Nonpermeate Flow SCFM | $O_2$ % | Nonpermeate Dewpoint °C. | Permeate Flow SCFM | $O_2$ % | P/l (× $10^{-6}$) $O_2$ | $N_2$ | $H_2O$ | Air | $\alpha_{N_2}^{O_2}$ | $\alpha_{air}^{H_2O}$ |
|---|---|---|---|---|---|---|---|---|---|---|---|---|---|---|

TABLE 3*-continued

| Test | Feed Temp °C. | Feed Press PSIG | Feed Dewpoint °C. | Nonpermeate Flow SCFM | Nonpermeate $O_2$ % | Nonpermeate Dewpoint °C. | Permeate Flow SCFM | Permeate $O_2$ % | P/l (× 10$^{-6}$) $O_2$ | P/l (× 10$^{-6}$) $N_2$ | P/l (× 10$^{-6}$) $H_2O$ | $\alpha_{N_2}^{O_2}$ | |
|---|---|---|---|---|---|---|---|---|---|---|---|---|---|
| air | 26 | 76 | 24.3 | 1.18 | 20.3 | 12.0 | 0.20 | 23.6 | 40.7 | 33.0 | 736. | 34.5 | 21.3 |
|  |  |  |  |  |  |  |  |  |  |  |  | $\alpha_{CH_4}^{CH_4}$ 1.23 | $\alpha_{CH_4}^{H_2O}$ |
| $CH_4$ | 26 | 56 | 22.5 | 1.5 | — | 18.0 | 0.11 | — | — | — | 901. | 30.0 | — 30.0 |

*1 SCFM = 2.832 × 10$^{-2}$ (std) m$^3$/min; 1 PSIG = 1.45 × 10$^2$ Pa

EXAMPLE 8

Single ended separators of about 1"×1' (2.54 cm×0.31 m) were constructed of hollow fibers made from a variety of polymers other than polysulfone.

The first two entries in the Table 4 are hollow fiber membranes spun from an acrylonitrile-styrene copolymer (AN/Styrene, #1435878-1 and 1435875-2). The copolymer consists of 47% acrylonitrile and 53% styrene by weight, made by standard polymerization techniques. Fibers were spun from solutions of the copolymer in mixtures of N,N-dimethylformamide solvent (75 weight percent) and formamide nonsolvent (25 weight percent). Fibers in sample module 1435878-1 were spun from a solution containing 36 weight percent copolymer and those in 1435875-2 were spun from a solution containing 34 weight percent copolymer. Washed fiber was dried in ambient laboratory air at about 50% RH and 20-25° C. Fiber dimensions (OD/ID) were about 600/350 micrometers for both of these AN/styrene copolymer samples.

The third and fourth entries in the Table 4 are hollow fiber membranes spun from poly(2,6-dimethylphenylene) oxide polymer (PPO, General Electric Corp.). Fibers were spun from a solution of PPO polymer dissolved in a mixture of N-methylpyrrolidone solvent (95 weight percent) and glycerin nonsolvent (5 weight percent). Polymer concentration in the spinning solution was 30% by weight. Washed fiber was dried 24 hours under a stream of flowing nitrogen gas at ambient laboratory temperature of about 20°-25° C. Fiber dimensions for the PPO sample was about 550/220 micrometers OD/ID. Results shown in Table 4 for PPO used the same sample module, i.e., the first PPO entry in the table is for untreated fiber and the second PPO entry is data obtained after 15 min. exposure to air which is supplied from an oil lubricated compressor at 140 psig (2.03×10$^4$ Pa) and thus contains oil vapor. This oil vapor treatment is similar to that discussed in Example 5.

The fifth and sixth entries in the Table 4 are comprised of hollow fiber membranes spun from a commercially available aromatic polyamide polymer (Trogamid-T, Dynamit Nobel). The polymer is believed to be made by condensation polymerization of trimethylhexamethylene diamine and terephthalic acid (1,4-benzene dicarboxylic acid). Fibers were spun from a solution of the polymer in a mixture of 1-formylpiperidine solvent (49 weight percent) and ethylene glycol nonsolvent (51 weight percent). Polymer concentration in the spinning solution was 37% by weight. Fiber dimensions (OD/ID) were about 590/310 micrometers. Washed fiber was dried in air at about 40° C. Results shown in Table 4 for Trogamid used the same module, i.e., the first Trogamid entry in the table is for untreated fiber and the second Trogamid entry is data obtained after 24 hour exposure to air which was supplied from an oil lubricated compressor at 140 psig (2.03×10$^4$ Pa) and thus contained oil vapor.

These separators were all tested using clean dry air feed which was passed through a water saturator to get wet air. The test conditions and results are listed in Table 4. These separators were made using epoxy castings as tube sheet and hot wire cut ends as were the polysulfone separators in other examples. Due to availability of fiber, bundle lengths differ.

TABLE 4*

| Fiber Type (Area cm$^2$) | Feed Temp. °C. | Feed Press PSIG | Feed Dew Point °C. | Nonpermeate Flow SCFM | Nonpermeate $O_2$ % | Nonpermeate Dew Point °C. | Permeate Flow SCFM | Permeate $O_2$ % | P/l (× 10$^{-6}$) $O_2$ | P/l (× 10$^{-6}$) $N_2$ | P/l (× 10$^{-6}$) $H_2O$ | P/l (× 10$^{-6}$) Air | $\alpha_{N_2}^{O_2}$ | $\alpha_{air}^{H_2O}$ |
|---|---|---|---|---|---|---|---|---|---|---|---|---|---|---|
| 1435878-1 AN/Styrene (2330 cm$^2$) | 26 | 77 | 26.4 | 0.30 | 20.7 | 23.7 | 0.017 | 21.6 | 8.5 | 8.1 | 147. | 8.2 | 1.05 | 17.8 |
| 1435875-2 AN/Styrene (1478 cm$^2$) | 26 | 77 | 23.2 | 0.28 | 20.7 | 17.3 | 0.027 | 22.8 | 22.6 | 19.7 | 348. | 20.3 | 1.15 | 17.2 |
| PPO 2164310-3 untreated (3774 cm$^2$) | 26 | 78 | 22.5 | 0.61 | 18.0 | 1.1 | 0.24 | 28.0 | 130. | 74. | 870. | 85.2 | 1.76 | 10.2 |
| PPO 2164310-3 after oily air feed treat, 15 min. at 140 psig | 26 | 78 | 23.4 | 0.61 | 18.1 | 6.1 | 0.17 | 30.7 | 103. | 50. | 767. | 60.6 | 2.06 | 12.7 |
| Trogamid 3726713-1 (3719 cm$^2$) | 26 | 78 | 23.4 | 1.05 | 20.6 | 14.7 | 0.51 | 21.4 | 157. | 150. | 448. | 151.4 | 1.05 | 3.0 |
| Trogamid 3726713-1 after oily air feed treat, 24 hrs. at 140 psig | 24 | 74 | 23.3 | 1.08 | 20.6 | 18.1 | 0.09 | 24.0 | 34.8 | 26.7 | 441. | 28.3 | 1.30 | 15.6 |

*1 SCFM = 2.832 × 10$^{-2}$ (std) m$^3$/min; 1 PSIG = 1.45 × 10$^2$ Pa

EXAMPLE 9

This example is to show that conditions employed in the drying of the as spun, washed fiber membrane can favorably influence the final properties of the device in terms of its performance in drying gases. Polysulfone hollow fiber membranes used in this example were spun as indicated in Example 4. Fiber which was water wet, following the post-spinning wash, was dried more slowly than in Examples 4-7. This slower drying was accomplished by running the fiber drying oven at the same temperature (95° C.) but the humidity or dewpoint of the oven air was much higher in this example. Oven dewpoint was maintained at 22° C. compared to dewpoints of 0°-10° C. in Examples 4-7. After drying, the fiber (500 μm OD, 250 pm ID) was formed into a single-ended 1"×1' (2.54 cm×0.31 m) separator. The shell side feed separator contained about 1000 fibers and had a surface area of 4350 cm². The separator was tested using a water saturated clean air feed at 27° C. and 76 psig ($1.1 \times 10^4$ Pa) Feed had a dewpoint of 25.0° C. Nonpermeate and permeate flows, dewpoints and $O_2$ concentrations were measured as follows:

| Nonpermeate | | | Permeate | |
|---|---|---|---|---|
| Flow SCFM | $O_2$ % | Dewpoint °C. | Flow SCFM | $O_2$ % |
| 0.75 | 20.5 | 10.1 | 0.17 | 22.3 |

NOTE:
1 SCFM = 2.832 × $10^{-2}$ (std) m³/min; 1 PSIG = 1.45 × $10^{-2}$ Pa.

P/ls (×$10^{-6}$) and αs were computed as follows:

| P/l$O_2$ | P/l$N_2$ | P/l$H_2O$ | P/l air | $\alpha_{N_2}^{O_2}$ | $\alpha_{air}^{H_2O}$ |
|---|---|---|---|---|---|
| 52.0 | 45.9 | 548. | 47.1 | 1.13 | 11.6 |

These results demonstrate that good membrane performance can be achieved by thermal treatments, as well as by various chemical treatments in the prior examples.

We claim:

1. A gas dehydration process, comprising;
   (a) contacting a feed gas containing water vapor with one side of uncoated, asymmetric membranes having controlled porosity, the membranes being formed of polymeric materials having transport selectivity for water vapor vs. the feed gas of at least about 1000% and sufficient porosity to provide adequate feed gas permeation sweep for the removal of permeated water vapor from a second side of the membrane ensuring conditions of continued dehydration;
   (b) permeating a majority of the water contained in the feed gas through the membrane; and
   (c) removing the resulting nonpermeate dehydrated gas from a chamber containing the membranes.

2. The gas dehydration process according to claim 1, wherein the feed gas is at a pressure of at least one atmosphere.

3. The gas dehydration process according to claim 1 wherein the feed gas is comprised of ambient air.

4. The gas dehydration process according to claim 1 wherein the feed gas is comprised of gases containing hydrocarbons.

5. The gas dehydration process according to claim 1 wherein the feed gas is comprised of at least one of ambient air, gases containing hydrocarbons, and acid gases.

6. The dehydration process according to claim 5 wherein the feed gas is comprised of carbon dioxide.

7. The gas dehydration process according to claim 5 wherein the feed gas is comprised of hydrocarbon gases having from one to about three carbon atoms per molecule.

8. The gas dehydration process according to claim 5 wherein the membranes are comprised of hollow fibers and the feed gas is introduced to a first end of the hollow fiber bore and the dehydrated feed gas is removed from a second end of the hollow fiber bore.

9. The gas dehydration process according to claim 1 wherein the uncoated, asymmetric membranes have controlled porosity as defined by the separation factor for oxygen/nitrogen from air of about 1.05 to about 2.0, the membranes being of polymeric materials which provide for water vapor permeability of about 300 to about $1500 \times 10^{-6}$ cm³/cm²-sec-cmHg and a separation factor for water vapor vs. slow gas components of the feed stream of about 10 to about 50, the slow gas components of the feed stream having a permeability of from about 10 to $100 \times 10^{-6}$ cms/cm²-sec-cmHg.

10. The gas dehydration process according to claim 9 wherein the membranes are formed of polymeric materials which also have transport selectivity for ammonia vs. the feed gas of at least about 1000%.

11. A gas dehydration process, comprising:
   (a) Contacting a feed gas containing water vapor with one side of uncoated, asymmetric gas separation membranes having graded-density skins, macrovoid-free morphology and having controlled porosity, the membranes being formed of polymeric materials having transport selectivity for water vapor vs. the feed gas of at least about 1000% and sufficient porosity to provide adequate feed gas permeation sweep for removal of the permeated water vapor from a second side of the membranes ensuring conditions of continued dehydration;
   (b) Permeating a majority of the water vapor contained in the feed gas through the membranes; and
   (c) removing the resulting nonpermeate dehydration gas from a chamber containing the membranes.

12. The gas dehydration process according to claim 11 wherein the asymmetric gas separation membranes having graded-density skins and macrovoid-free morphology are comprised of glassy, hydrophobic polymers wherein the membranes have increased free volume as evidence by the membrane first heat $T_g$ which is greater than the first heat $T_g$ of bulk samples of the glassy, hydrophobic polymers.

13. The gas dehydration process according to claim 12 wherein the asymmetric gas separation membranes having graded-density skins, macrovoid-free morphology and controlled porosity as defined by the separation factor for oxygen/nitrogen from air of about 1.05 to about 2.0, the membranes being of a polymeric material which provide for water vapor permeability of about 300 to about $1500 \times 10^{-6}$ cm³/cm²-sec-cmHg and a separation factor for water vapor vs. slow gas components of the feed stream of about 10 to about 50, the slow gas components of the feed stream having a permeability of from about 10 to about $100 \times 10^{-6}$ cm³/cm²-sec-cmHg.

14. The gas dehydration process according to claim 13 wherein the feed gas is at a pressure of at least one atmosphere.

15. The gas dehydration process according to claim 13 wherein the feed gas is comprised of ambient air.

16. The gas dehydration process according to claim 13 wherein the feed gas is comprised of gases containing hydrocarbons.

17. The gas dehydration process according to claim 13 wherein the feed gas is comprised of at least one of ambient air, gases containing hydrocarbons, and acid gases.

18. The gas dehydration process according to claim 13 wherein the membranes are comprised of hollow fibers and the feed gas is introduced to a first end of the hollow fiber bore and the dehydrated feed gas is removed from a second end of the hollow fiber bore.

19. The gas dehydration process according to claim 13 wherein the membranes are formed of polymeric materials which also have transport selectivity for ammonia vs. the feed gas of at least about 1000%.

20. A gas dehydration apparatus comprising; a chamber containing uncoated, asymmetric membranes having controlled porosity, the membranes being formed of polymeric materials having transport selectivity for water vapor vs. the feed gas of at least about 1000% and sufficient porosity to provide adequate feed gas permeation sweep for removal of the permeated water vapor, the membranes arranged within the chamber so that a feed gas may contact one side of the membranes through header means and only permeated gases from the feed gas can be removed from a second side of the membranes contained in the chamber.

21. The gas dehydration apparatus according to claim 20 wherein the uncoated, asymmetric membranes have controlled porosity as defined by the separation factor for oxygen/nitrogen from air of about 1.05 to about 2.0, the membranes being of polymeric materials which provide for water vapor permeability of about 300 to $1500 \times 10^{-6}$ cm$^3$/cm$^2$-sec-cmHg and a separation factor for water vapor vs. slow gas components of the feed stream of about 10 to about 50, the slow gas components of feed stream having a permeability of from about 10 to $100 \times 10^{-6}$ cm$^2$/cm$^2$-sec-cmHg.

22. A gas dehydration apparatus according to claim 21 wherein the membranes are comprised of hollow fiber membranes and the membranes are contained within the chamber at a packing factor, area fraction occupied by hollow fiber membranes cross sectional area of the chamber cross sectional area, of at least about 40% up to a maximum of about 75%.

23. A gas dehydration apparatus according to claim 21 wherein the membranes are comprised of asymmetric gas separation membranes having graded-density skins and macrovoid-free morphology, the membranes being comprised of glassy hydrophobic polymers wherein the membranes have increased free volume as evidence by the membrane first heat $T_g$ which is greater than the first heat $T_g$ of the bulk sample of the glassy, hydrophobic polymers.

24. A process for reducing porosity of preformed, uncoated asymmetric gas separation membranes comprising; contacting the preformed membrane with at least one chemical compound either in gas or liquid form, the compound having the ability of reducing pore size of the preformed membrane resulting in the asymmetric membranes having controlled porosity as defined by the separation factor for oxygen/nitrogen from air of about 1.05 to about 2.0, the membranes being of polymeric materials which provide for water vapor permeability of about 300 to $1500 \times 10^{-6}$ cm$^3$/cm$^2$-sec-cmHg and the separation factor for water vapor vs. slow gas component of the feed stream of about 10 to about 50, the slow gas components of the feed stream having a permeability of about 10 to $100 \times 10^{-6}$ cm$^3$/cm$^2$-sec-cmHg.

25. The process for reducing porosity of preformed uncoated asymmetric gas separation membranes according to claim 24 wherein the membranes have graded-density skins, macrovoid-free morphology and are formed of polymeric materials having transport selectivity for water vapor vs. the feed gas of at least about 1000% and sufficient porosity to provide adequate feed gas permeation sweep for removal of permeated water vapor from a second side of a membrane ensuring conditions of continued dehydration.

26. A process for reducing porosity of preformed, uncoated asymmetric gas separtaion membranes comprising; reducing pore size of the preformed membranes through drying and annealing means which result in the asymmetric membranes having controlled porosity as defined by the separation factor for oxygen/nitrogen from air of about 1.05 to about 2.0, the membranes being formed of polymeric materials which provide for water vapor permeability of about 300 to $1500 \times 10^{-6}$ cm$^3$/cm$^2$-sec-cmHg and the separation factor for water vapor vs. slow gas component of the feed stream of about 10 to about 50, the slow gas components of the feed stream having a permeability of about 10 to $100 \times 10^{-6}$ cm$^3$/cm$^2$-sec-cmHg.

27. The process for reducing porosity of preformed uncoated asymmetric gas separation membranes according to claim 26 wherein the membranes have graded-density skins, macrovoid-free morphology and are formed of polymeric materials having transport selectivity for water vapor vs. the feed gas of at least about 1000% and sufficient porosity to provide adequate feed gas permeation sweep for removal of permeated water vapor from a second side of a membrane ensuring conditions of continued dehydration.

* * * * *